July 15, 1958 E. NORMAN 2,843,074
SHIP'S BUMPER
Filed Feb. 7, 1956
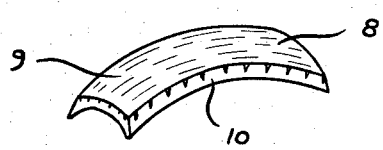
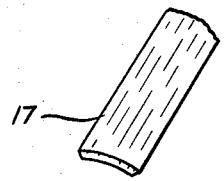
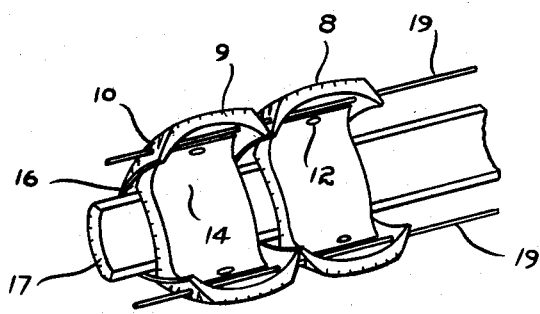
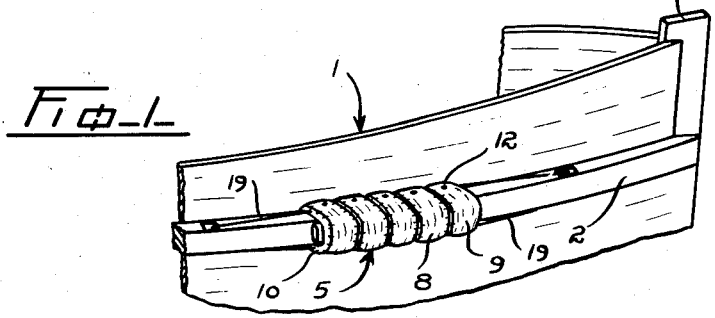
INVENTOR
EINAR NORMAN
ATTORNEY

2,843,074

SHIP'S BUMPER

Einar Norman, Vancouver, British Columbia, Canada

Application February 7, 1956, Serial No. 564,013

3 Claims. (Cl. 114—219)

My invention relates to improvements in ship's bumpers.

The objects of the invention are to provide a bumper which can be made up to any length to conform to any curvature and fit any bumper strip of such crafts as fishing vessels, tugs and the like.

A further object is to provide a bumper which can be so attached to the bumper strip as to prevent its being displaced vertically, irrespective of the nature of impact or rubbing that it is subjected to.

Referring to the accompanying drawings:

Figure 1 is an elevation of the prow of a vessel having a bumper strip to which the invention is fitted.

Figure 2 is a perspective view of an outer cover member of the invention.

Figure 3 is a perspective view of an inner transverse member of the bumper.

Figure 4 is a perspective view of a longitudinal strip.

Figure 5 is a perspective view of the bumper as viewed from the inside, said bumper being made up of a plurality of sections.

In the drawings like characters of reference indicate corresponding parts in each figure.

The numeral 1 indicates generally a portion of a ship's hull having a bumper strip 2 curving around towards the stem post 3 of said hull.

The numeral 5 indicates generally a bumper which is preferably made of components cut from used car or truck tires. The bumper is made up of arcuate sections 8 each long enough to extend around the exposed area of the bumper strip 2 as shown in Figure 1. The sections 8 consist of a tread portion 9 and narrow side walls 10 and are arranged in side by side relation with the side wall of one section in intimate contact with the side wall of another section. United to the inner face of the tread portion 9 of each section 8 by bolts or rivets 12, is a cross piece 14 formed of similar material to that of the section, except that the circumferential portion of the cross piece extends lengthwise of the multi-section bumper. The cross piece 14 and the tread portion 9 of a section will in effect form the chord and the arc of said section and will define an intervening space 16. Extending through the spaces 16 of each of the sections 8 is an elongated strip 17 of resilient material, preferably cut from the tread of tires, which strip is preferably united with one or more of the cross pieces to prevent its withdrawal from the bumper.

Each section 8 is apertured adjacent the intersecting line between the tread portion 9 and the side walls 10 to receive two cables 19 which extend beyond the ends of the completed bumper and serve as a means for securing said bumper to the bumper strip 2, or any other convenient part of the vessel.

What I claim as my invention is:

1. A ship's bumper comprising a plurality of arcuate sections of a tire, each having a tread portion and side wall portions extending the length of the arcuate section, a cross piece of substantially similar material disposed within each arcuate section with its tread extending at right angles to the tread of the arcuate section, means securing the side walls of each cross piece to the adjoining arcuate section, and a strip of resilient material extending lengthwise between the several cross pieces and the several arcuate sections.

2. A ship's bumper as claimed in claim 1, wherein the arcuate sections are joined together by cable means extending through said arcuate sections adjacent the borders of their treads.

3. A ship's bumper comprising an arcuate section of a tire having a tread portion and side wall portions extending the length of the arcuate section, a cross piece of substantially similar material disposed within the arcuate section with its tread extending at right angles to the tread of the arcuate section, means securing the side walls of the cross piece to the arcuate section, said cross piece defining a space between its tread portion and the arcuate section and an elongated strip of resilient material extending through the space.

References Cited in the file of this patent

FOREIGN PATENTS

| 17,227 | Great Britain | 1897 |
| 532,304 | Great Britain | Jan. 21, 1941 |